United States Patent [19]
Fuchs et al.

[11] Patent Number: 5,722,927
[45] Date of Patent: Mar. 3, 1998

[54] PROCESS AND INSTALLATION FOR PRODUCING MATERIALS WITH MODIFIED PROPERTIES

[75] Inventors: Helmut Fuchs, Neuwürschnitz; Frieder Markert, Crottendorf, both of Germany

[73] Assignee: Environmental Technologies (Europe) Limited, Essex, United Kingdom

[21] Appl. No.: 284,652

[22] PCT Filed: Feb. 6, 1993

[86] PCT No.: PCT/DE93/00102

§ 371 Date: Oct. 31, 1994

§ 102(e) Date: Oct. 31, 1994

[87] PCT Pub. No.: WO93/16009

PCT Pub. Date: Aug. 19, 1993

[30] Foreign Application Priority Data

Feb. 11, 1992 [DE] Germany .................. 42 03 866.9
Jun. 3, 1992 [DE] Germany .................. 42 18 216.6
Aug. 24, 1992 [DE] Germany .................. 42 27 996.8

[51] Int. Cl.⁶ ............................................... B09B 3/00
[52] U.S. Cl. .......................... 588/252; 588/258; 588/900
[58] Field of Search ............................ 588/252, 255, 588/256, 257, 258, 900

[56] References Cited

U.S. PATENT DOCUMENTS

| | | | |
|---|---|---|---|
| 4,179,263 | 12/1979 | Jung et al. | 588/257 X |
| 4,547,290 | 10/1985 | Pichat | 588/257 |
| 4,772,430 | 9/1988 | Sauda et al. | 588/255 X |
| 5,177,305 | 1/1993 | Pichat | 588/257 |
| 5,220,112 | 6/1993 | Bucci et al. | 588/256 |
| 5,245,121 | 9/1993 | Gall et al. | 588/257 |
| 5,322,603 | 6/1994 | Kameda et al. | 588/255 X |

*Primary Examiner*—George A. Suchfield
*Attorney, Agent, or Firm*—Antonelli, Terry, Stout, & Kraus, LLP

[57] ABSTRACT

A method for manufacturing filler materials for minerally bonded structural elements with thermal treatment of the starting materials to be used as filler materials involves subjecting comminuted high-polymer materials comprised of natural or synthetic origin materials to a shock-like heat radiation treatment by passing the materials under an irradiation unit to provide a temperature gradient of at least 20K per mm of travel distance of the materials beneath the irradiation unit in which an iron temperature of more than 600° C. can be measured whereby the materials are inertized and are activated by heat in the range of a molar energy of 60 to 170 kJ*mol⁻¹ and then placing the resulting activated materials in a crystal-forming solution of inorganic substances that enter into a permanently adhesive bond with a basic matrix of a composite material to be formed therefrom.

12 Claims, 4 Drawing Sheets

1

PROCESS AND INSTALLATION FOR PRODUCING MATERIALS WITH MODIFIED PROPERTIES

FIELD OF THE INVENTION

The invention relates to a process and an installation for producing materials for heat, sound, vibration, and radiation damping, minerally bonded blocks with non-brittle behavior under compressive and bending stress in the form of breeze concrete floors, insulating panels, perforated parking panels, hollow blocks, breeze concrete panels for compartmentizing framework structures, shock-loaded intermediate layers in highway and railroad beds, protective layers for geotextiles or sealing films in earthworks, and beds with heat, sound, vibration, and/or nuclear-radiation-damping requirements.

This material, whose properties have been modified, contains as the carrier material a considerable amount of comminuted unsorted materials and comminuted worn-out products or remnants from the textile, leather, and artificial leather industries. Depending on the application, minerally bonded materials in the form of dust, ash, and/or sludge as well as biologically toxic materials can be added to this material depending on the application, but must be subjected to treatment to inertize them in the material that is produced.

The process is especially environmentally beneficial thanks to the utilization of remnants and waste materials as well as worn-out products from the textile, leather, and artificial leather industries, and also in particular by the processing of nonmetallic components from automobile recycling as well as dust, ash, and sludge from waste treatment facilities.

The method also allows utilization of empty containers which the law requires to be returned, made of paper, cardboard, plastic, and laminated materials from commercial enterprises. This process also helps the environment by saving on natural resources such as sand, gravel, and stone chips as well as by reducing the amounts used of mineral binders and setting accelerators.

BACKGROUND OF THE INVENTION

The known technical solutions for utilization of comminuted nonmetallic industrial and household waste as fillers or raw materials use as the starting material for example 40 to 60 wt. % of textile fibers, synthetic resin based binders, for example for the manufacture of artificial stone (WO 89/11457), for insulating material made of melamine resin fiber mats (DE 3147308), or insulating panels made of urea-formaldehyde resin (DD 235291). Other methods are aimed at bonding comminuted fibrous materials by gluing with addition of thermoplastic fibers and exposure to the action of heat and pressure (DD 209772, DD 259819), or gluing the fibers together with addition of glue and reaction promoters (DE 3641464).

Such processes and the corresponding production facilities have a high energy requirement and are very expensive. Hence they do not constitute an economical alternative to processing the large amounts of organic fillers and raw materials that accumulate.

To improve the properties of cellulose-fiber-reinforced inorganic molded bodies, systems for steam curing for aftertreatment are also known (DE 3734729). Thermal aftertreatments are also used for manufacturing lightweight construction additives from finely comminuted waste, whereby, by sintering in a combustion process, cellular structures are produced by reacting organic components in sintered pellets with a closed outer skin (DE 3404750) or in which the conversion of solid wastes with at least 30 wt. % cellulose content, for example household waste, takes place in the presence of burnt lime with a sudden increase in temperature from less than 100° C. to a temperature that is at least equal to 250° C., into solid, inert, water-insoluble materials (DD 247891). Fired fillers made of expanded clay aggregate are also produced at temperatures above 1200° C.

These methods for manufacturing pretreated fillers involve high technical and technological expense, which makes such waste utilization for the organic materials that accumulate in industrial operations and homes uneconomical.

Other processes use mechanical anchoring in the basic matrix of concrete to bond the fibrous materials, for example by fibrillation of the fibers (EP 0152490), roughening the fiber surfaces (EP 0343180), or by means of beads and thickenings on the fiber surfaces (DE 2930939). These also include the manufacturing methods with the corresponding systems for fiber composite materials, in which mats made of chopped strands (DE 3916815) or pretreated textiles in strand form (DE 3508552) are added, embedded in concrete. Methods for manufacturing fabric-reinforced cement structures (EP 0135374) and the textile reinforcement of mortar with wide-mesh fiber or knit (DE 3238993) have a similar effect.

To improve the structural physical properties, especially heat insulation, noise, and vibration damping, processes plus systems are used for adding special fillers for example to the construction material for heat insulation (EP 0139791) or the use of comminuted textile material in heat-insulating plaster using foam-promoting wetting agents (DD 236300), powder or granulate of thermoplastic plastics as a filler in amounts up to 60% (EP 0242334) or waste from old tires, up to 95 wt. % to improve the thermal insulation in construction (DE 2929925).

The known solutions have in common the disadvantage that they can be used either only for specific fillers or raw materials or only for special structures and the economic parameters for manufacturing or processing large amounts, if they are used at all because of the specific nature of the construction or the fillers, are often unsatisfactory.

The systems used to produce the prior art products are of course tailored to the individual specific process parameters because of the fundamental differences in the process. They are not transferable to the technical conversion of the new method for manufacturing fillers or raw materials whose properties have been modified.

SUMMARY OF THE INVENTION

These drawbacks are overcome by virtue of the fact that a universally applicable material is developed and manufactured that contains maximum volume amounts of comminuted, mixed, and unsorted materials or worn-out products from the textile, leather, and artificial leather industries without chemical additives, in other words only materials that are used as binders and setting accelerators in any event in the technological process of manufacturing minerally bonded blocks. Not only material chips but also dust and sludge from waste-treatment facilities can be worked into the additives.

Hence the goal of the invention is to process the nonmetallic materials that occur in recycling processes and have heretofore not been possible to use, as well as unsorted and mixed materials or worn-out products or remnants from the textile, leather, and artificial leather industries, in comminuted form, with mineral binders to form raw materials, especially lightweight construction additives, with non-brittle behavior under mechanical stresses and with heat, sound, vibration, and/or radiation-damping properties that can be modified to suit the application.

In addition it is also the goal of the invention to design a production facility with which, starting with in particular processed materials or recycled products from the textile, leather, and artificial leather industries, nonmetallic materials recovered from old cars, and waste packing material, minerally bonded structural materials or blocks with modified structural physical properties can be manufactured at low cost.

In another form of application of the invention, it is intended to be possible to prepare a covering that inhibits the passage of gas, which is not destroyed when loaded, and also withstands varying stresses.

The essence of the invention consists in the fact that the high-polymer materials comminuted into fillers for minerally bonded blocks are subjected to shock heat irradiation to inertize them and to activate them before they are mixed with crystal-forming aqueous solutions of mineral binding accelerators and mineral binders.

The features according to the invention for heat treatment are the extremely high color temperature of approximately 2800K of the radiator generating the heat flux and the high energy concentration in a linear focus that lead to high temperature gradients of at least 20K per mm of distance traveled before and after the linear focus.

The high energy concentration in the adjustable linear focus also means that maximum iron temperatures of more than 600° C. at the linear focus can be measured and the irradiated materials are activated thermally with a molar energy in the range of 60 to 170 kJ.mol$^{-1}$, so that when these materials, which have been rendered free of microorganisms and thus simultaneously activated, are placed in aqueous solutions of mineral binding accelerators and binders firmly adhering crystal complexes distributed over the surfaces are formed.

As the binding accelerator is to be added, waterglass or soluble silicon fluoride are preferably suitable for simultaneous flameproofing and weather protection of the materials thus treated in conjunction with cement, plaster, or other ceramics as binders.

The distribution density of the crystal complexes adhering to the surfaces of the materials thus treated can be influenced by the dose, regulated by the throughput rate and the layer thickness of the material, the activation energy used and the concentration of the mineral binding accelerator contained in an aqueous solution, with the water content corresponding to the mixing water requirement of the binder.

The non-brittle heat, sound, and vibration damping properties result from the fact that the binders do not completely surround the comminuted material chips but, between adjacent material chips with partially distributed, adhesive crystal complexes, bridges made of the binder gel, cement paste for example, form and they firmly seal the material chips when they cure. The residual elastic behavior of the high-polymer material volumes between the crystal adhesion points lends the minerally bonded material thus produced the desired structural physical properties.

Admixture of radiant energy absorbent materials such as inert lead and boron compounds, aluminum hydroxide, gadolinium oxide, or magnetite in the aqueous solution of the binding accelerator, in the minerally bonded material thus produced, produces radiation protection properties, especially also for secondary gamma and neutron radiation. This involves insoluble bonding of the above-mentioned materials added.

In aqueous mixtures with the binding accelerators to be used, sludge, for example from wastewater treatment plants, can be added to the material, and the water content of the sludge must be adjusted to the mixing water requirement of the binder.

When the sludge from wastewater treatment plants that is added contains biologically toxic components, the air-dried loose minerally bonded materials must be inertized by another heat treatment like that performed at the outset in treating the material chips.

The moldable mixture of materials can then be processed and pressed into conventional molds, to form minerally bonded structural elements such as perforated parking panels, insulating panels, hollow blocks, or lightweight structural elements for walls. As a result of air drying, the material that is piled only loosely produces a bulk filler for use as a property-modified minerally bonded material for example in poured-in-place concrete or floor mortar, or as a lightweight additive instead of sand, gravel, and stone chips in any minerally bonded structural elements.

The modification of the properties of the products of the process takes place primarily by adjusting the mixture components and the ratio of these components to one another. The following are used in particular as components:

Comminuted unsorted materials from recycling returns of packaging materials of all kinds;

Comminuted worn-out products and remnants from the textile, leather, and artificial leather industry;

Comminuted plastic materials from automobile recycling;

Dust, ash, and/or sludge;

Biologically toxic materials.

On the other hand, the modification of the properties is performed by the mineralization process itself:

Depending on the minerals and mineral admixtures used, for example
nonflammable by waterglass
weather-resistant by fluorosilicate the strength and elasticity behavior depends on the energy dose and the density of the crystal coating;

radiation protection effect by mineral additives;

heat insulation, noise damping is influenced by compression (technological measure);

resistance to aggressive chemicals, e.g., alkali damage; adhesive crystals on the surface of the mineralized materials cannot be removed by intensive washing;

the bonding of the mixture components takes place as a result of mineral bonding with cement through these firmly adhering crystals; the strength and elasticity behavior can be influenced in this manner.

The system according to the invention for manufacturing materials with properties modified for minerally bonded structural elements consists of a combination of known, commercial machines and equipment with special devices designed and used according to the invention, with which the technological conditions for the manufacturing method are met. For this purpose, system components are arranged sequentially in the sequence required by the technology for a continuous treatment process in a line.

The material feed device is located at the input of the system. Remnants and recycling products are divided here between those that contain hard particles and those that do not. This device consists for example of a conveyor belt fed by a grab.

The materials added are fed to a comminuting device in which, preferably by means of shredders, the materials with the hard parts and those free of them are comminuted separately. A design is preferred in which the shredder for the materials containing the hard particles operates by the shear principle and the shredder for the materials containing no hard particles uses the high-speed beating principle.

The comminuting device is followed by the dust remover with the dust precipitator to carry away the dust-laden exhaust air. The precipitation channel itself has several water curtains that are traversed by the dust-laden airstream. This dust precipitator also allows the dust to be fed into the process conducted by the system. Dust added in this manner can also be shearing dust, industrial dust, or ash.

Another important feature of the invention is the fact that the dust separated from the material added and the dust added externally through the dust precipitator in a clarified form, can be fed back into the process conducted by the system, within the framework of the mineralization device or the mixer.

The dust separator is followed by a metering device. The metering device consists firstly of a compartmented wheel lock which receives the material chips from the dust separator in free fall and which, by means of the rpm-adjustable discharge wheel of the compartmented wheel lock, ensures loading of the conveyor belt located under the compartmented wheel lock.

The metering device consists, secondly, preferably, of one spreading roller and one scraping roller, arranged with their axes preferably perpendicular to the conveyor belt and driven in the direction opposite to the direction of motion of the conveyor belt. As a result of the rollers that operate against the conveyor belt and the direction of feed, the material chips that land on the conveyor belt after being dumped there by the compartmented wheel lock are distributed over the width of the conveyor belt and their height is made uniform so that after they leave the metering device, in other words after they pass the spreader roller, a loosely formed band of material chips rests on the conveyor belt.

This band of material chips resting on the conveyor belt is now sent to a device to inertize them. The inertization system which consists of at least one, but preferably several heat flux generators combined into a heat radiation battery, has a shock-like heat radiation effect with a high energy concentration.

The heat flux generators are installed parallel to the conveying level, preferably in linear fashion as a line of heat radiators above and perpendicular to the direction of movement of the conveyor belt.

In addition, to increase the degree of inertization, another inertization device is provided. This inertization device according to the invention is located at the end of the conveyor belt and in this case is mounted so that the material chips that come off the end of the conveyor belt pass through the second inertization system in free fall. In this manner, radiation on both sides and hence through-radiation of the material chips is possible.

For this purpose, the second inertization system consists of at least two heat flux generators located opposite one another at a distance such that the material chips, which are guided by means of a funnel located upstream, can readily pass in free fall.

Such an increase in the degree of inertization is necessary in particular when freedom of the materials from harmful substances must be guaranteed.

As a result of the shock irradiation with heat, the material chips are rendered inert and activated before they are mixed with crystal-forming aqueous solutions of mineral binders. This process takes place in the mineralization device that follows the system for inertizing the materials. The mineralization device can be designed as a screw conveyor in which the dissolved mineral in the water is combined with the mineral chips that have been inertized, the water, and/or the sludge.

The activated chip material is mineralized as it passes through.

In the mixer which follows, final mixing of the mineralized material chips with solvent residues of the mineral as well as sludge components, binders, and wastewater from the dust precipitator takes place.

Hence, a material that can be used according to the invention can be removed from the mixer.

If the added or admixed dust and/or sludge contain biologically toxic components, aftertreatment with an additional system for inertizing them is required.

This system for inertizing materials and aftertreating them, which completes the technological manufacturing process, can be designed analogously to the systems for inertizing materials described above.

The materials that modify the properties are suitable for example for:

processing to form minerally bonded structural materials in the shape of breeze concrete floors, insulating panels, breeze concrete blocks and hollow blocks as well as breeze concrete panels for finishing framework structures;

creation of vibration damping machine bases and intermediate layers subjected to impact in highway and railroad beds;

incorporation of protective layers for geotextiles and sealing films in excavation and backfilling with heat, sound, vibration, and radiation damping effects.

In particular, the materials manufactured by this method give the minerally bonded structural elements a non-brittle behavior previously unknown in construction under dynamic and high static compressive stresses. Such structural materials guarantee earthquake safety for the structures built from them and are an effective means for protection against damage by infrasound, etc.

The following can be mentioned as commercial and technological advantages of the products:

The starting materials are economical and are available in large quantities in the form of remnants and recycling products from industrial and household collection;

No prolonged setting times are required and the minerally bonded structural elements that are produced can be removed from the mold immediately, and processing can be conducted independently of the effects of weathering;

By means of mixing ratios, inertization, activation, and compression, the modifiable properties of the materials for processing into special soundproofing, heat-insulating, vibration-damping, and radiation-absorbing elements can be adjusted.

In another application of the invention with incorporation of the property-modified materials, structural layers that inhibit the through-passage of gas are manufactured. Such structural layers are used to cover extensive areas that emit gases, for example garbage dumps, mine tailings, filled swamps and bogs.

The theoretical solution consists in placing the layer that inhibits the passage of gas between a non-brittle upper layer and lower layer. To produce such non-brittle layers, mineralized and cement-bonded material chips are especially suitable which show an elastic behavior which is the same as that of the intermediate layer to be protected.

This intermediate layer which inhibits the passage of gas advantageously consists of a water-storing and swelling mineral powder material that is placed between two elastic textile webs and held there by the textile.

The effect of inhibiting the passage of gas is achieved by virtue of the fact that a sufficiently thick layer of water forms in the water-storing mineral powder material that suppresses the passage of gas.

The advantages achieved here consist particularly in the fact that the non-brittle flexible structural layers are not destroyed by possible loads and withstand changing stresses and the water-storing effect of the powdered swellable material deposited between the nonwoven fiber webs results in a secure layer that inhibits the passage of gas.

An important advantage also consists in the effect of reducing radioactive radiation that is offered by the embedded water layer in swollen mineral powder as well as in avoiding the emission of radioactive gases in the first place.

With the process according to the invention and the corresponding system, waste products occurring in recycling processes that are nonmetallic and previously could not be used are processed for the first time. This refers in particular to the following:

waste from automobile recycling, such as mixed composite materials with textiles, plastics, rubberized hair, jute fibers, artificial leather, leather, etc. These materials arrive unsorted and can be inertized without flame treatment;

tannery wastewater residues with a bacteriological load (biologically toxic substances);

contaminated plastic packaging materials (cups for food, etc.);

old textiles which have been picked out of a dump; processing of already stored old textiles from existing dumps is possible.

In addition, complete replacement of mineral additives such as sand, gravel, and rock chips is also possible.

As a result of the property modification explained above, minerally bonded materials or structural elements with a wide range of different properties can be produced.

Thus, heat-, sound-, vibration-, and/or radiation-damping properties can be conferred.

By using the radiation-damping properties, a new application for the raw materials to be processed according the invention has been found; in conjunction with geotextiles, for example with radon-tight "Bentofix" matting as an elastic protective layer in cleaning up old mines or a base for building in radon-affected areas.

New properties include:

water permeability even at high pressure loads, resistance to water buildup, resistance to freezing/thawing cycles, stuffability up to 60% without breaking, with high sturdiness when subjected to continuous vibration.

BRIEF DESCRIPTION OF THE DRAWINGS

The invention will be described below without limitation of the general idea of the invention on the basis of examples possibly with reference to the drawing, and express reference will also be made regarding the disclosure of all of the details according to the invention not described in greater detail in the text.

DETAILED DESCRIPTION OF THE INVENTION

Figure 1:
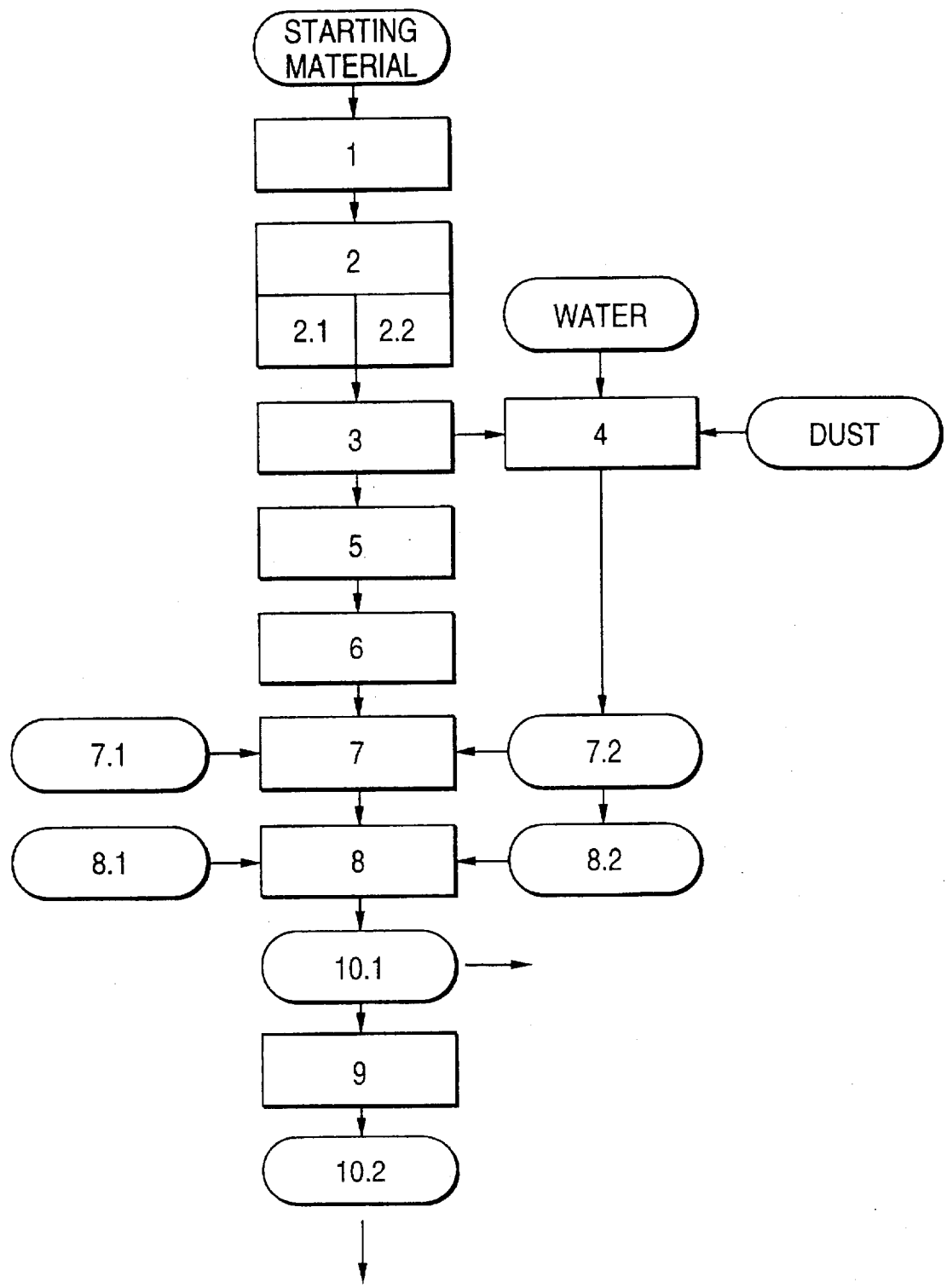
FIG. 1 shows the schematic construction of the system for manufacturing property-modified structural and filling materials, shown as a block diagram.

The method according to the invention will now be described in greater detail with three sample recipes.

1. Manufacture of wall panels from property-modified materials for minerally bound structural elements 1.1. Comminuted textile wastes made of polyamide (screen size 20×20 mm) are thermally inertized and activated on a conveyor belt with an energy expenditure of approximately 0.54 kWh/m$^3$. A radiation beam device with 1350 W halogen infrared light suspended over the conveyor belt is used as the heat source. Then 435 l of the textile chips pretreated in this manner are mixed with 60 l of waterglass solution in a concentration of 8° Be for mixing in a planetary mixer.

After premixing, 100 kg of cement as the binder and an additional 10 l of waterglass in a concentration of 37° Be as well as 20 l of mixing water are added to the mixing process.

1.2 After mixing is complete, lasting about 5 minutes, the mixed material is poured into a slab mold to produce wall panels measuring 740×320×140 mm.

1.2. Textile wastes made of polyamide and old textiles comminuted in a shredder as well as nonmetallic materials from auto recycling are inertized and activated by heat treatment as in Example 1.1. This was followed by dry mixing with 80 l of textile wastes made of polyamide, 55 l of comminuted auto panel parts, 80 l of coarse foam flakes from auto seats, 100 l of comminuted "Duroplast" from Trabant bodies, 20 l of rubberized hair from automobile cushions, and 100 l of old textile mixture in a planetary mixer. The following were then added and mixed: 60 l of waterglass with a concentration of 8° Be, as a binder 130 l of cement, 20 l of water as makeup water, 10 l of waterglass with a concentration of 37° Be, and 40 l of calcium chloride solution in a concentration of 3° Be as the mineral setting accelerator.

After mixing was complete, wall panels of breeze concrete measuring 740×320×140 mm could be manufactured with this material on the conventional slab mold.

2. Manufacture of property-modified materials by incorporating residual sludge from a wastewater treatment plant 100 parts by volume of textile chips pretreated with heat were mixed with 20 volume parts waterglass solution at 12° Be with the addition of 20 volume parts sludge, consisting of a mixture of tannery sludge and magnetite as a precipitating agent, as well as 20 parts by volume of cement as a binder. After drying for 24 hours the resultant minerally bonded and loosely piled material was heat-treated again and thus inertized. It was then odorless.

Manufacture of minerally bonded materials by incorporating wastewater 3.1. 40 parts by volume of tannery wastewater and 20 parts by volume of cement were mixed with 100 parts by volume, saturated with 10 parts by volume of waterglass solution at 10° Be, of textile chips pretreated with heat and then dried. After storage for 24 hours, followed by the material being inertized, a loose, odorless, cement-bonded material is obtained for minerally bonded structural elements.

3.2. 100 parts by volume of textile chips pretreated with heat were mixed with 10 parts by volume of waterglass solution at 37° Be, 40 parts by volume of tannery wastewater, and 25 parts by volume of cement. After storage for 24 hours, this produces an odorless, loose, cement-bonded material for minerally bonded structural elements.

FIG. 1 shows the combination of equipment and machinery for a system for manufacturing property-modified materials.

The materials to be comminuted and/or worn-out products or remnants from the textile, leather, and artificial leather industry, nonmetallic materials from old automobiles, and packaging wastes are separated into materials containing hard parts and materials free of hard parts by material feed 1 with a grab, and fed to comminuting device 2. Comminuting device 2 consists of a shredder for materials 2.1 with hard components which works by the reversion principle as well as a shredder for materials 2.2 that are free of hard parts or free of metal and industrial wastes, especially those accumulating in large volumes and made of paper, cardboard, leather, artificial leather, textiles, plastics, and composite materials.

The materials fed mixed into the comminuting device are conveyed pneumatically into a dust remover 3.

The dust-laden exhaust air is conducted from the dust remover into a dust precipitator 4. Here the dust is elutriated by a spray of water. At the same time, dusty wastes can be blown into this dust precipitator and elutriated for further processing in the same way.

Figure 2:
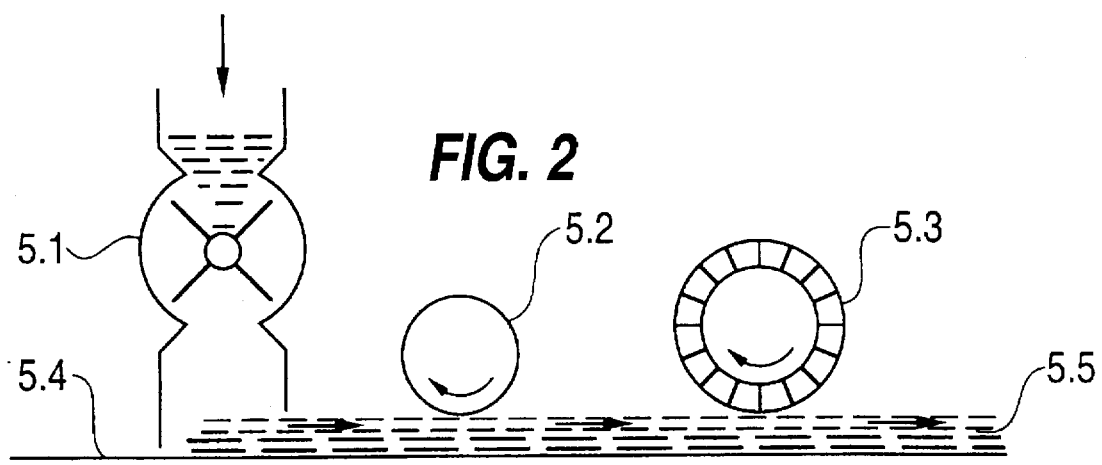
FIG. 2 shows the metering device for producing evenly distributed surface areas.

The material chips produced in comminuting device 2 are fed to metering device 5 in free fall from dust remover 3. The structure of the metering device is shown in FIG. 2.

From compartmented wheel lock 5.1 the waste chips are ejected in batches onto a conveyor belt 5.4 distributed with a spreading roller 5.2, driven in the direction opposite to the conveying direction, transversely with respect to the transport direction, and laid out with a scraping roller 5.3 likewise running in the opposite direction to form a band of material chips 5.5 with approximately equal distribution over conveyor belt 5.4.

With the metering device therefore, a roughly uniformly distributed mass per unit area of material chip strip 5.5 is achieved, as is required for subsequent inertization.

Figure 3:
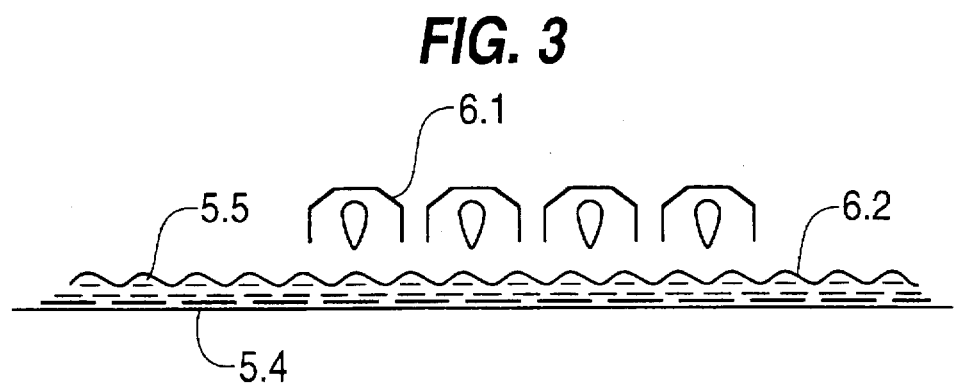
FIG. 3 shows the sequence of heat flux generators in the system for inertizing objects.

According to FIG. 3, the device for inertizing objects consists of a heat flux generator 6.1 made up of a row of four steel beams distributed over a length of about 1 m.

The radiators each have a width of 1.00 m. Halogen infrared lamps can be used as the radiators themselves.

Beneath the heat flux generator, the material chip belt 5.5 lying on conveyor belt 5.4 is treated with an energy application of about 0.5 kWh/m$^3$ and leaves the device for inertizing objects as inert material chips 6.2.

Increasing the degree of inertness is achieved by treating the material chips in free fall after they have left the conveyor belt.

Figure 4:
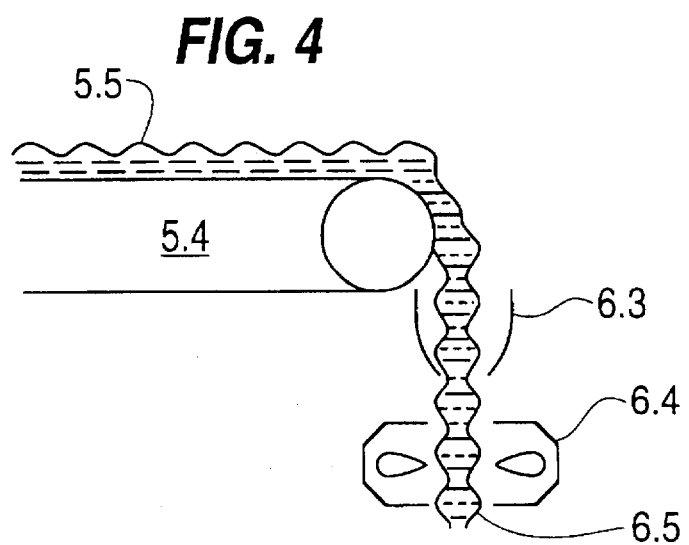
FIG. 4 is a system for inertizing objects with through-radiation of the scrap chips on both sides.

For this purpose, a device that adjoins conveyor belt 5.4 in the ejection direction according to FIG. 4 is used, consisting of a funnel 6.3 and a second heat flux generator 6.4 which ensures irradiation of material chips 6.2 on both sides. By using funnel 6.3, the material chips that drop in free fall are guided so that the chips fall loosely between two radiation beams 6.4 spaced apart from one another.

With this arrangement shown in FIG. 4, material chips that have been irradiated on both sides and thus inertized may be produced. This method of rendering objects inert is especially necessary in particular for recycled biologically toxic material.

Device 6 for inertizing objects is, as may be seen from FIG. 1, followed by a mineralizing device 7 in which the material chips 6.5 that have been inertized are brought into contact with the aqueous solution of mineral 7.1 and other admixtures such as sludge 7.2 from the dust precipitator or waste sludge. Mineralizing device 7 is formed for example by a commercial trough screw conveyor in which the water-dissolved mineral with the material chips that have been inertized, water, and/or sludge are mixed intimately with one another during transport.

At the same time the activated chip material in mineralized.

The mineralized material chips are fed to mixer 8 with the solution residues of mineral and sludge components as well as binder 8.1 and wastewater 8.2 from dust precipitator 4.

Advantageously a commercial forced-circulation mixer is used as the mixer. As a result of the mixing process, a usable product 10.1 results.

The combination of devices 1 to 8 must be supplemented by a posttreatment device 9 if the dust, sludge, or wastewater components added to mixer 8 still contain biologically toxic components. Posttreatment device 9 is of the same design as device 6 for inertizing objects. Advantageously the device for inertizing objects according to FIG. 4 is suitable as a posttreatment device with the material being transported from mixer 8 by a conveyor belt 5.4 to funnel 6.3.

Heat flux generator 6.4 of the posttreatment device consists of heat radiation sources located opposite one another that irradiate the material passing between them in free fall from both sides.

The low half-value thicknesses of the irradiated materials ensure the effectiveness of the posttreatment and hence complete inertization of the material as an end product 10.2.

Figure 5:
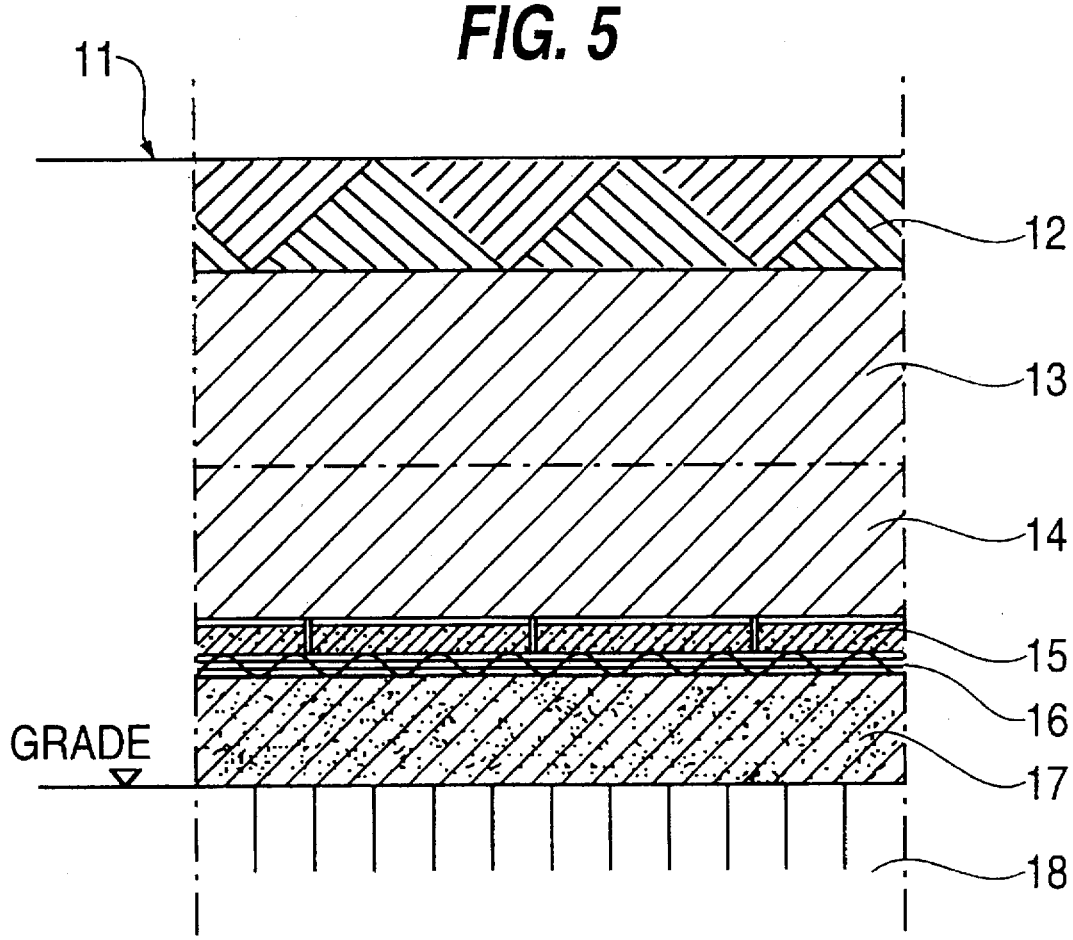
FIG. 5 shows the procedure and the structure of the layers when covering extensive gas-emitting areas.

The procedure and layer structure when using material manufactured according to the invention to cover extensive gas-emitting areas are shown in FIG. 5.

The construction layers are adjusted in thickness to the individual conditions and the fill with mineral soil and topsoil (arable soil) is established according to the vegetation conditions of the desired use for agriculture or forestry.

Despite the leveling and compacting of the dump material 8, irregularities that appear in the grade can be compensated by adding a sufficiently thick layer of mineralized poured-in-place concrete 17 made of textile chips and cement. According to the invention, on top of this layer 17 of poured-in-place concrete made of textile chips and cement, sealing mat 16 and on top of that a cover layer 15 of prefabricated slabs of a textile chip-cement-concrete or a poured-in-place concrete according to layer 17 can be applied. On top of this, the soil layers 14, 13, and 12 are added for a covering and a vegetation layer.

The following layer structure was selected for this embodiment. On top of covering layer 15, about 5 cm thick, a mineral soil 14 from overburden or recycling material is applied in a depth of at least 20 to 50 cm. Then a mineral soil 13 that would promote vegetation is added to a thickness of at least 50 cm. This is followed by topsoil 12 about 30 cm thick according to DIN 18300 as a surface layer 11.

A swellable water-storing mineral is placed between nonwoven fabric webs as a sealing mat 16. Layer 17 made of mineralized poured-in-place concrete made of textile chips and cement is at least 12 cm thick on the average.

Figure 6:
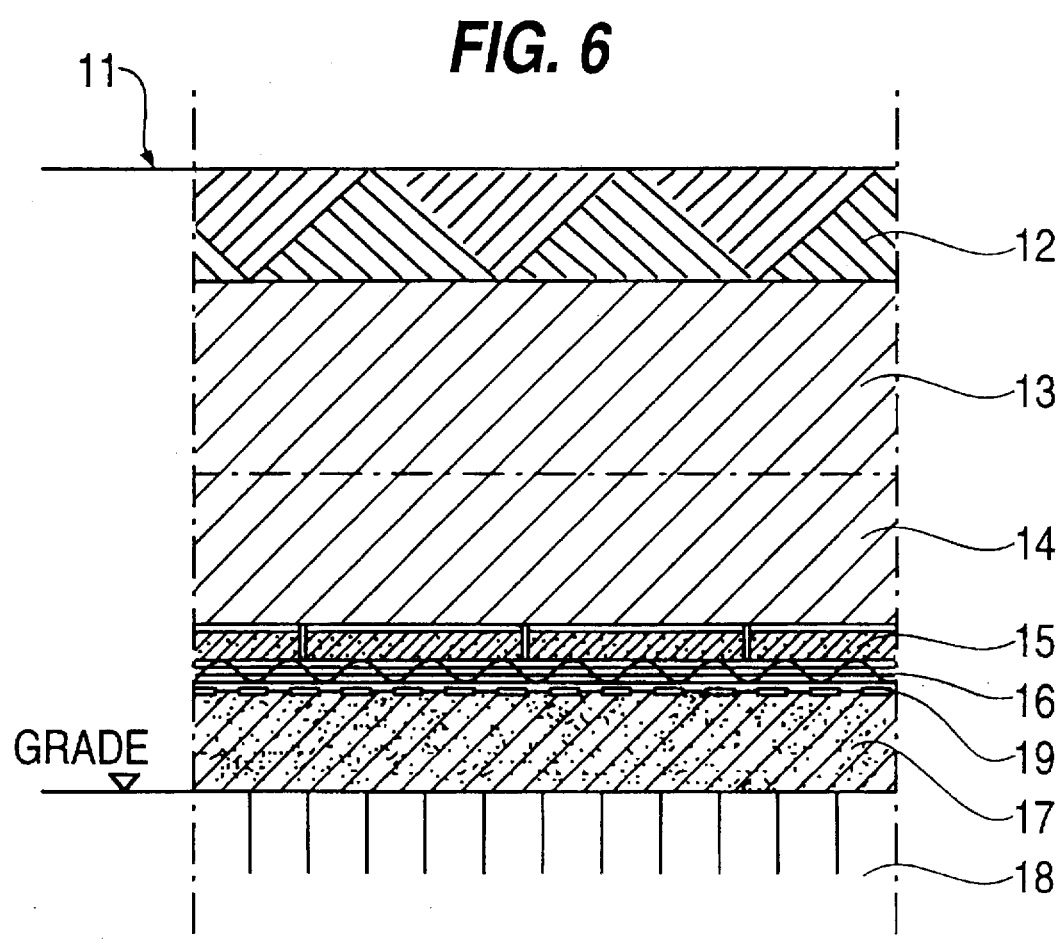
FIG. 6 shows the use of the method to cover dumps emitting large amounts of radon.

In the embodiment shown in FIG. 6, the material according to the invention is used to cover dumps emitting radon.

The corresponding construction of the covering can be seen in the shape of its layered structure in FIG. 6. Layers 11 to 16 are arranged and built up by analogy with the embodiment in FIG. 5.

One special feature in this case is the additional plastic sealing web 19 between the mineralized poured-in-place concrete 17 made of textile chips and cement and the water-storing layer 16 provided when the intensity of the radon in the dump material is high. With this arrangement of plastic sealing web 19, the disadvantages that formerly were encountered when using non-embedded plastic sealing webs are avoided.

We claim:

1. A method for manufacturing filler materials for minerally bonded structural elements with thermal treatment of the starting materials to be used as filler materials, which comprises subjecting comminuted high-polymer materials comprised of natural or synthetic origin materials to a shock-like heat radiation treatment by directing the materials past an irradiation unit to provide a temperature gradient of at least 20K per mm of travel distance of the materials past the irradiation unit in which a temperature of more than 600° C. can be measured whereby the materials are inertized and are activated by heat in the range of a molar energy of 60 to 170 kJ*mol$^{-1}$ and then placing the resulting activated materials in a crystal-forming solution of inorganic substances that enter into a permanently adhesive bond with a basic matrix of a composite material to be formed therefrom.

2. A method according to claim 1, wherein the crystal-forming solution of inorganic substances comprises waterglass or soluble silicon fluoride used as a setting accelerator for simultaneously flameproofing and weatherproofing of the materials thus treated; said method further comprising admixing the composite material with cement, plaster or other ceramic materials as a binder.

3. A method according to claim 2 further comprising controlling a distribution density of crystal complexes adhering to surfaces of the materials thus treated by the dosage of applied activation energy, to be controlled by the throughput speed of travel of the materials pass the irradiation unit and by concentration of the inorganic substances comprising a setting accelerator in the crystal-forming solution.

4. A method according to claim 1, wherein the crystal-forming solution of inorganic substances comprising a mixture of silicate gels and cement is partially applied to surfaces of elastic high-polymer materials thereby making the structure of the resulting composite material non-brittle and giving the composite material heat, sound and vibration-damping properties.

5. A method according to claim 1, which further comprises admixing and bonding materials having radiation energy absorbent properties and comprising inert lead and boron compounds, aluminum hydroxide, gadolinium oxide or magnetite insolubly with the crystal-forming solution of inorganic substances.

6. A method according to claim 1, wherein a composite material comprises a moldable material mixture and said method further comprises molding said moldable material mixture in molds to make mineral structure elements including perforated parking panels, insulating panels, hollow blocks or lightweight wall elements or wherein with air drying of the composite material producing a loose material for use as a property-modified minerally bonded filler used in poured-in-place concrete, floor mortar or as a lightweight construction additive.

7. A system for conducting the method according to claim 1, wherein the high-polymer materials comprise materials selected from the group consisting of remnants of recycled products from textile, leather and artifical leather industry, nonmetallic materials from old automobiles and packing material wastes, said system comprising a combination of the following elements arranged sequentially:

(1) a material supply device wherein starting materials containing hard objects and starting materials free of hard objects are added separately;

(2) a comminuting device comprising a shredder for effecting comminution of the materials containing hard objects and the materials free of hard or metal objects to form a comminuted material chip mixture;

(3) a dust separator for processing the comminuted material chip mixture including a dust precipitator to conduct away dust-laden air, said precipitator being used to recycle dust components within the system to provide material chips;

(4) a metering device to which material chips are fed from the dust separator by gravity via free fall, said metering device depositing the material chips uniformly on a conveyor belt;

(5) an irradiation unit for inertizing the material chips, said irradiation unit comprising a plurality of radient heat generators which can be focused to provide a high energy concentration on the material chips uniformly disposed on the conveyor belt;

(6) a mineralizing device in which the material chips that have been inertized come in contact with the crystal-forming solution; and (7) a mixer forming a final mixture of the mineralized material chips with a binder.

8. A system according to claim 7, wherein the metering device comprises a compartmented wheel lock, a spreader roller, a scraper roller, and a conveyor belt on which the material mixture leaving the wheel lock is deposited, with the spreader roller and the scraper roller being driven in a direction opposite the direction of motion of the conveyor belt.

9. A system according to claim 7, wherein a discharge wheel of the compartmented wheel lock effects dispersion of the material mixture with metering being a function of the rotational speed of the discharge wheel and the scraper roller comprises a beater or brush roll and the conveyor belt comprises a simple belt, plate conveyor or scraper conveyor.

10. A system according to claim 7, wherein the irradiation unit for inertizing the material chips comprises a series arrangement of radiant heat generators installed parallel to a conveyor plane at right angles to the conveyor belt, said radiant heat generators being arranged above a strip of the material chips resting on the conveyor belt emerging from the metering device and, in addition, a second irradiation unit is arranged on one side above the conveyor belt for irradiating the inertized material chips again from both sides, said additional unit comprising a plurality of radiant heat generators mounted opposite one another with a hopper mounted above and directed at a gap separating the generators, with the material chips to be processed passing by gravity between the heat radiant generators.

11. A system according to claim 7, wherein the mineralizing device comprises a screw conveyor and the mixer comprises a forced-circulation mixer.

12. A system according to claim 7 further comprising a post treatment device connected downstream of the mixer for further treating the mixture when biologically toxic components are incorporated into the material subsequent to the mixer, said post treatment device comprising another irradiation unit for inertizing the mixture containing the biologically toxic components, said pretreatment device comprising a hopper and a plurality of radiant heat generators located opposite one another to treat the material during free fall from the hopper.

* * * * *